United States Patent

[11] 3,607,408

[72] Inventor Joseph C. Duddy
 Trevose, Pa.
[21] Appl. No. 874,276
[22] Filed Nov. 5, 1969
[45] Patented Sept. 21, 1971
[73] Assignee ESB Incorporated
 Philadelphia, Pa.

[54] DRY-CHARGED LEAD ACID STORAGE BATTERY HAVING PARTIALLY RECHARGED ELECTRODES AND METHOD
2 Claims, 1 Drawing Fig.
[52] U.S. Cl. .................................................. 136/26,
 136/27, 136/76, 136/34
[51] Int. Cl. ....................................................H01m39/00
[50] Field of Search........................................... 136/26, 27,
 76, 6, 33, 34, 161

[56] References Cited
UNITED STATES PATENTS
3,447,969 6/1969 Tudor et al. .................. 136/26

Primary Examiner—Winston A. Douglas
Assistant Examiner—C. F. Lefevour
Attorneys—Alfred J. Snyder, Jr., Robert H. Robinson and Raymond L. Balfour ABSTRACT: A dry-charged lead acid storage battery has partially recharged electrodes which serve as a source of sulfate ions. An additional source of sulfate ions is also inside the battery container. In contrast to the partially or fully discharged electrodes in previous dry batteries, the electrodes of this invention are characterized by having active material in which the percent of lead sulfate in the active material at a specified distance from the center of the electrode grid decreases as the specified distance of the material from the grid decreases. These improved electrodes are produced by being fully charged, then completely discharged, then partially recharged, and then washed and dried.

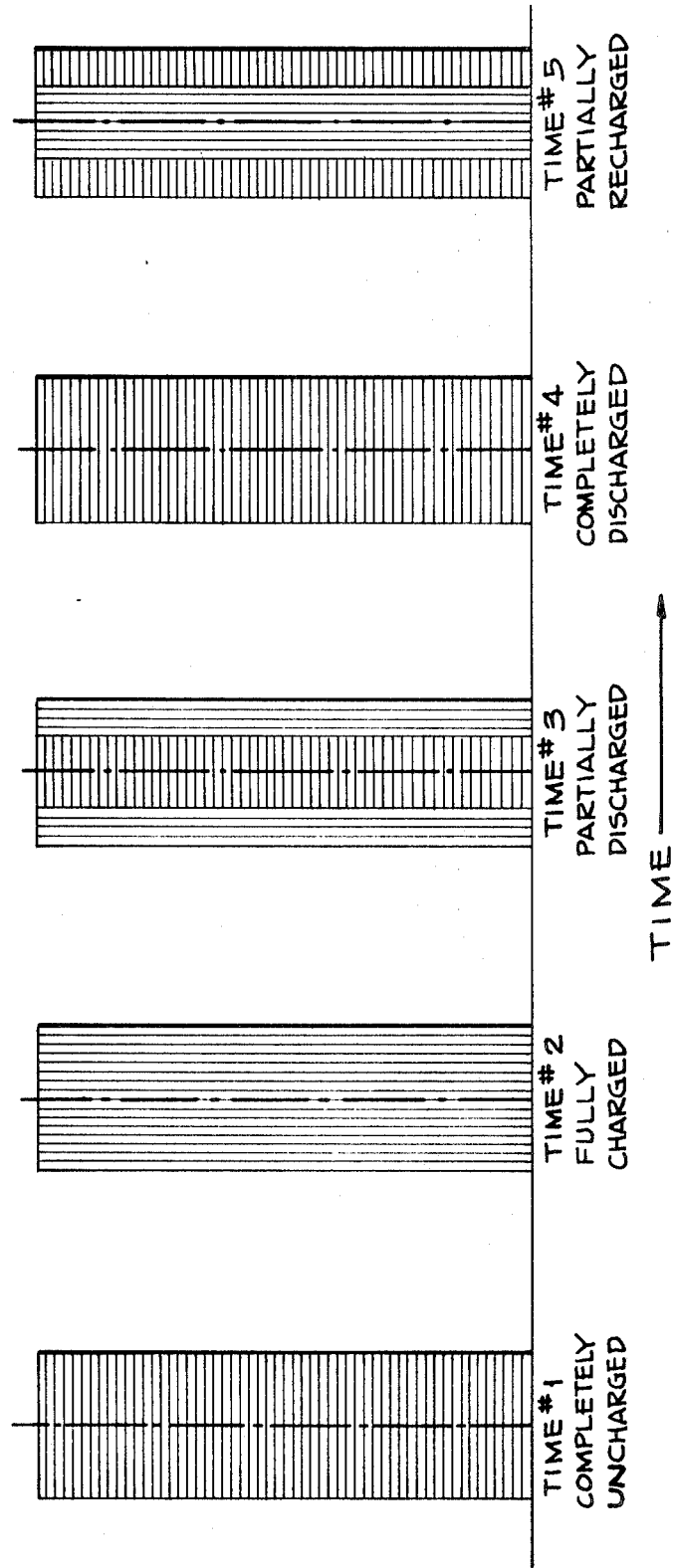

DRY-CHARGED LEAD ACID STORAGE BATTERY HAVING PARTIALLY RECHARGED ELECTRODES AND METHOD

BACKGROUND OF THE INVENTION

Among the disadvantages of today's dry-charged lead acid automotive batteries is the fact they are activated by the addition of sulfuric acid, a time-consuming, hazardous, and annoying process for the attendant doing the work. A second drawback results from the requirement to give the battery a charge after adding the acid and before placing the battery in service, a time-consuming step of inconvenience both to the attendant and to the car owner awaiting the battery before he can drive away.

Attempts to eliminate the hazards associated with handling acid, as well as hopefully to reduce the time required to activate and charge, have been made by storing inside the battery container a substance which in the presence of water will produce the battery's electrolyte. In some instances this substance is simply highly concentrated liquid sulfuric acid which upon addition of water will be diluted to the desired concentration, while in others it is some other sulfate ion compound (frequently a solid or semisolid gelatinous compound) which will react with or dissolve in water to produce sulfuric acid of the desired strength. Whatever the substance may be, one of the problems associated with its storage inside the battery container is the fact that the available space inside the container is severely limited, and simply increasing the dimensions of the container to increase the internal space is not always a possible or desirable solution. One of the big efforts of the internal storage approach, then, is to use every available measure of space inside the container.

One location inside the container where sulfate ion compounds might be stored is in the electrodes themselves. When the battery is in the discharged condition the active material of both the positive and negative electrodes is a sulfate ion containing compound, $PbSO_4$, which will react electrochemically with water to produce sulfuric acid, and so partially discharged electrodes may serve as a partial source of sulfate ion supply, supplementing the quantities stored elsewhere and in other forms inside the container. An inherent drawback of this approach is that while the desire is to have a battery which has already been charged in the manufacturing plant and can therefore be quickly activated later at a service station without a booster charge, to use the electrodes as a storehouse for sulfate ions requires the electrodes to be at least partially discharged. Nevertheless one form of this approach has been tried in a manner to be described in the paragraphs below.

The manufacturing process used to produce dry charged batteries involves immersing the positive and negative electrodes, both of which initially contain a lead compound active material consisting of mainly PbO (minor quantities of $PbSO_4$ are also present), into sulfuric acid, where there is an immediate chemical reaction in electrodes of both polarity, $PbO + H_2SO_4 \rightarrow PbSO_4 + H_2O$. The electrodes are then "formed" or "charged," a step in which the $PbSO_4$ is electrochemically converted into a higher oxidation state, $PbO_2$, at the positive electrode and into a lower oxidation state, Pb, at the negative electrode. The electrodes are then washed, following which the final step is to dry them. The drying must be done to remove water which otherwise would slowly, unintentionally, and undesirably activate the battery as it sits on the shelf awaiting usage. The drying must be done in a manner such that the act of drying will in itself not discharge the electrodes, e.g., primarily a danger of oxidizing the elemental lead in the negative electrodes.

In the past if it was desired to use the electrodes as a storehouse for sulfate ions, they were simply partially of fully discharged after being fully "charged" or "formed," thus electrochemically reconverting some or substantially all of the $PbO_2$ in the positives and the Pb in the negatives back into $PbSO_4$. Thus the sequence of electrode processing was fully charging, partially or fully discharging, washing, and drying. Since the electrochemical reactions begin at the surface of the grid where there is an interface between the electrically conductive grid, the active material, and the sulfuric acid, and slowly progress outwardly toward the exterior of the electrode, this meant that at the conclusion of the partial discharge step there was a $PbSO_4$ gradient in the active material, a gradient in which the percent of lead sulfate in the active material at a specified distance from the center of the electrode grid increased as the specified distance of the material from the grid decreased. In short, the closer to the grid one looks, the greater the percentage of $PbSO_4$ in the active material he would find.

With the previous method described above, at the end of a partial discharge step the exterior of each electrode was relatively rich in charged active material ($PbO_2$ in the positive, Pb in the negative) while the interior was relatively rich in the discharged form of the lead, $PbSO_4$. $PbSO_4$ is well recognized to be a poor conductor of electricity. The resultant electrodes of this previous method therefore had the following characteristics: (a) the charged active material, which should be closest to the grid to give greatest cranking power from the battery, was predominantly in the most remote possible location with respect to the grid; and, (b) by having a high proportion of $PbSO_4$ near the center of the electrode, there was in effect a layer of poorly conductive material between the charged active material and the grid. Thus there existed a gradient, a ratio of charged to discharged material at a specified distance from the grid center which varied as the distance from the grid center also varied, and this gradient was in the unfavorable direction.

SUMMARY OF THE INVENTION

The invention consists of a recognition that the $PbSO_4$ gradient of previous dried, partially discharged electrodes was unfavorable and the discovery of a simple way to make the gradient more favorable.

The present invention consists of making the $PbSO_4$ gradient more favorable. The process of manufacturing dry-charged electrodes according to the present invention, beginning with the conventional green electrodes having PbO active material in both the positive and negative electrodes, consists of fully charging, then completely discharging, then partially recharging, and then washing and drying the electrodes. The results are electrodes characterized by having active material in which the percent of lead sulfate in the active material at a specified distance from the center of the electrode grid decreases as the specified distance of the material from the grid decreases. The benefit is that, compared with electrodes of the prior partial discharge process having the same total ratio of charged to discharged active material in the total of all active material in the electrodes, the electrodes produced by this invention yield a battery having better cranking characteristic immediately after activation.

BRIEF DESCRIPTION OF THE DRAWING

The drawing illustrates a lead acid battery electrode, either positive or negative, in various states of charge and discharge. The illustrations of the electrode are taken at five different times, and are shown in the time sequence in which they would occur using the present invention.

The five illustrations represent oversimplifications of the degree to which active material at a specified distance from the center of the electrode grid is charged or discharged. In actual fact the active material at a given distance from the center of the grid will likely contain both charged and discharged material, even in electrodes commonly described as being "fully charged" or "completely discharged." (Neither charging nor discharging is totally effective in actual practice, and in common usage such terms as "fully charged" and "completely discharged" refer to the conditions which exist after such actual charging and discharging are complete and discontinued.) Also in actual fact there is no sharp boundary between the charged and discharged material, but rather a gradual gradient such as is discussed in the Background and Summary sections above would exist. Despite the errors resulting from oversimplification, the five illustrations in the drawing will serve to illustrate conceptually the method and result of the present invention.

The center lines in the five illustrations are intended to represent the center of the electrode grid. If the electrode is a flat plate such as is conventional in automotive batteries in the United States today, the grid is also a skeleton, platelike structure and the center of the grid is a plane. If the electrode is a circular object such as the tubular electrodes commonly used today in lead acid batteries for motive-power purposes, the center of the grid is the grid's lineal axis. The active material surrounds the grid.

Time 01 is at the beginning of the time sequence with which the present invention is concerned, namely when the electrodes are completely uncharged and the "formation" has not yet begun, or at its very beginning. At that time the lead active material in both the positive and negative electrodes is mostly PbO.

Time 02 is later in the formation process, when the electrodes are fully formed or charged. At this time the active material in the positive electrodes is substantially all $PbO_2$, while the active material in the negatives is substantially all Pb.

Time 03 is still later, after the electrodes shown at Time 02 have been partially discharged. At Time 03 the interiors of both the positive and negative electrodes will contain a greater percentage of $PbSO_4$ than will their exteriors. Time 03 represents the point at which the partial discharge step of the previous method described in the Background section above has been stopped and the washing and drying begun.

Time 04 is still later, when the discharging shown in a partially complete stage in Time 03 has been carried to completion. The active material in both positive and negative electrodes at Time 04 is substantially all $PbSO_4$.

Time 05 is still later, after the completely discharged electrodes shown at Time 04 have been partially recharged. At Time 05 the interiors of both the positive and negative electrodes will contain a smaller percentage of $PbSO_4$ than will their exteriors.

The symbol used in the drawing to designate "noncharged" active material is used for both uncharged material (that which has never been charged) and for discharged material (that which has previously been charged, then discharged). The use of a common symbol in the drawings is not intended to imply that uncharged and discharged materials are identical (in fact they are not), but only to imply a distinction between charged and noncharged material.

DESCRIPTION OF THE PREFERRED EMBODIMENT

From what has already been stated in the Background, Summary, and Description of the Drawing sections, an understanding of the invention should by now be clear.

The invention consists both of a method for producing dry-charged electrodes and a battery containing such electrodes. The first step in the method consists of immersing an electrode having a lead compound active material into a sulfuric acid solution. This step is symbolized by Time 01 in the drawing, when the active material is mostly PbO in both positives and negatives, referred to as "completely uncharged" in the drawing.

The next step consists of charging the electrodes to a state of substantially full charge, shown as Time 02. The term "substantially full charge" is used rather than "full charge," both because (as stated above) the active material in fact is usually not 100 percent charged even when in the state commonly described as "fully charged," and also because it is desirable but not essential to charge the electrodes up to the condition commonly described as "fully charged,".

The next step in the method of this invention consists of discharging the electrodes to a state of substantially complete discharge, shown as Time 04 in the drawing. The qualifying term "substantially" is used for reasons similar to those stated in the preceding paragraph. While carrying out this step of the process the electrodes pass through a state represented by Time 03 in the drawing.

Next, the electrodes are recharged to a state of partial charge. The rate of recharging is variable, but should be at such a rate that the active material on the interior of the electrode, but not much of the active material on the exterior, is charged. The exact time, the exact ratio of charged to discharged active material at a specified distance from the center of the grid in either positive or negative electrodes when this step is discontinued is not critical and is essentially a matter which results from the designer's choice of recharging rates and other factors. At Time 05 the interiors of both the positive and negative electrodes will contain a higher percentage of charged active material, $PbO_2$ and Pb respectively, than will their exteriors, the condition which this invention seeks to achieve; but the electrodes of both polarity will also contain some discharged active material, $PbSO_4$, which is desirable from the point of view that it represents stored sulfate ions which can serve as a partial source of supply to produce sulfuric acid after water is added, but which is undesirable from the point of view that it represents discharged active material which will later have to be charged (although not necessarily charged before the battery is placed in service in an automobile).

The final steps of the process are washing and drying of the electrodes, which may be carried out with conventional techniques.

The products which result from this process are ones in which the percent of lead sulfate in the active material at a specified distance from the center of the electrode grid decreases as the specified distance of the material from the grid decreases.

The electrodes may be used in an otherwise conventional battery, one having a conventional container, cover and terminals. The terminals constitute means for conducting electrical current between the exterior of the container and the positive electrodes inside the container, as well as additional means for conducting electrical current between the exterior of the container and the negative electrodes inside the container.

An additional component of the dry-charged battery of this invention is a source of sulfate ions inside the container which is in addition to the $PbSO_4$ active material in the electrodes. The present invention is not to be limited as to the specific composition of that additional source, whether merely concentrated liquid $H_2SO_4$ or some other substance which will react with or dissolve in water to produce liquid $H_2SO_4$. Neither is it limited to the location of that additional source, whether in the otherwise unoccupied space inside the container above, beside, or beneath the electrodes, or whether included in or comprising the separators between the electrodes. And neither is the invention confined to batteries in which the additional source of sulfate ions is confined or restrained in some manner, either to prevent the substance from absorbing any moisture which might remain in the "dried" electrodes or to prevent the acid from damaging the separators during storage or immediately after water addition; this category of batteries includes ones in which the sulfate ion substance is confined in plastic containers opened by a variety of methods.

Test results indicate that a cell made according to the present invention yields better cranking characteristics at a given time after activation than a cell otherwise identical but having electrodes represented by the illustration in the drawing designated as Time 03. For comparison purposes four Group 24 size cells of 60 ampere hour capacity (at the 20 hour discharge rate) and having electrodes and separators of conventional and identical design were discharged. Discharge during testing was at a constant current rate of 150 amps and was at a temperature of 110° F.; discharge of the cells was begun 15 minutes after addition of water and the extra sulfate ions to the dry-charged cells, and without any booster charge having been given. The first cell, used as an absolute reference, was a wet, fully charged cell rather than one which has been dry-charged; the specific gravity of its $H_2SO_4$ electrolyte was 1.270. The second cell was a dry-charged one having half-discharged electrodes represented by illustrations as Time 03 in the drawing. The third cell was also a dry-charged one having half-recharged electrodes represented by illustrations as Time 05 in the drawing. (By "half-discharged," "half-charged," and "half-recharged" is meant that 50 percent is discharged.) In both the second and third cells the rate of charging and discharging was held constant at a 5 ampere rate. The additional source of sulfate ions supplied to each of the second and third cells was 180 cc. of $H_2SO_4$ having a specific gravity of 1.700; to each of these two cells 530 cc. of water was also added, and the resultant electrolyte has a specific gravity of approximately 1.210. The fourth cell also had dried electrodes, but they were conventionally dry-charged and were substantially completely charged; the specific gravity of the electrolyte in the fourth cell was 1.27.

The cell voltages are shown in Table I:

Table I

| Time (measurements for Cells 2–4 beginning 15 minutes after activation) | Cell 01 (wet, fully charged), Volts | Cell 02 (dry, half-discharged electrodes), Volts | Cell 03 (dry, half-recharged electrodes), Volts | Cell 04 (dry, fully charged electrodes), Volts |
| --- | --- | --- | --- | --- |
| 5 secs. | 1.81 | 1.64 | 1.69 | 1.74 |
| 30 secs. | 1.82 | 1.63 | 1.68 | 1.73 |
| 1 min. | 1.80 | 1.60 | 1.67 | 1.72 |
| 1½ min. |  | 1.57 | 1.65 | 1.70 |
| 2 min. | 1.79 | 1.54 | 1.64 | 1.69 |
| 2½ min. |  | 1.52 | 1.62 | 1.68 |
| 3 min. | 1.78 | 1.47 | 1.61 | 1.66 |
| 3½ min. |  | 1.40 | 1.60 | 1.64 |
| 4 min. | 1.76 |  | 1.58 | 1.63 |
| 4½ min. |  |  | 1.55 | 1.61 |
| 5 min. | 1.74 |  | 1.52 | 1.59 |
| 5½ min. |  |  | 1.49 | 1.56 |
| 6 min. | 1.72 |  |  | 1.50 |
| 6½ min. |  |  |  | 1.40 |
| 7 min. | 1.70 |  |  |  |
| 8 min. | 1.66 |  |  |  |
| 9 min. | 1.62 |  |  |  |
| 10 min. | 1.53 |  |  |  |

The most interesting comparison, the one which compares the cell of the present invention with its counterpart made under the previous method, is between the results of Cell 02 and Cell 03. Cell 03, the one of the present invention, comes much closer than does Cell 02 to the desired goal of letting a car owner install a freshly activated battery in his car and drive away without waiting a long time for the battery to receive a booster charge. After engine-starting the generator or alternator could be used to charge the discharged material in the electrodes, and this could be done while the car was being driven.

The step of completely discharging the electrodes so that they may be partially recharged again is more time consuming than the previous method but is not necessarily very wasteful of electrical energy, since a circuit for discharging one group of electrodes can well be the source of power for charging another group of electrodes.

During the initial charging or forming step the electrodes will undergo a transition during which the active material in their interiors will be more fully charged than it will be in their exteriors, and consequently the electrodes will have active material in which the percent of lead sulfate in the active material at a specified distance from the center of the electrode grid decreases as the specified distance of the material from the grid decreases. During the initial charging, therefore, the electrodes are between the stages represented by Times 01 and 02 in the drawing and are at a stage which, if it were to be shown on the drawing, would appear identical to the condition represented by Time 05. In fact these electrodes which have never been fully charged once and are only partially charged are quite different from ones which have been fully charged, then fully discharged, and subsequently partially recharged, even though the percents of charged and recharged active materials might be the same at the two times. It is well recognized in the battery art that until the electrodes have been fully charged at least once their active material has very poor charge acceptance.

I claim:
1. A method of producing a partially charged and dry electrode for a lead acid battery comprising the steps of:
   a. immersing an electrode having a grid surrounded by lead compound active material comprising PbO into a sulfuric acid solution;
   b. charging the electrode to a state of substantially full charge;
   c. discharging the electrode to a state of substantially complete discharge;
   d. recharging the electrode to a state of partial charge whereby the electrode is characterized by having active material in which the percent of charged active material increases over a specified distance from the center to the exterior of the electrode as the distance from the grid decreases and in which the percent of lead sulfate decreases over a specified distance from the center of the electrode grid to the exterior of the electrode as the distance from the grid decreases;
   e. washing the electrode; and,
   f. drying the electrode.
2. A dry-charged lead acid storage battery having
   a. a container,
   b. dry positive and negative electrodes within the container which have previously been fully charged, each electrode consisting of a grid surrounded by lead compound active material, the lead compound active material in the positive electrode comprising an oxide of lead-charged material and lead sulfate discharged material and the lead compound active material in the negative electrode comprising lead charged material and lead sulfate discharged material,
   c. a source of sulfate ions inside the container which is in addition to the electrodes,
   d. a cover on the container, and
   e. means for conducting electrical current between the exterior of the container and the positive electrodes and additional means for conducting electrical current between the exterior of the container and the negative electrodes, wherein the improvement comprises:
      each of the positive and negative electrodes characterized by having active material in which the percent of charged active material increases over a specified distance from the center of the electrode grid to the exterior of the electrode as the distance from the grid decreases and in which the percent of lead sulfate decreases over a specified distance from the center of the electrode grid to the exterior of the electrode as the distance from the grid decreases.